United States Patent
Yamazaki et al.

(10) Patent No.: US 6,798,548 B2
(45) Date of Patent: Sep. 28, 2004

(54) APPARATUS FOR ROTATING A LASER (75) Inventors: Takaaki Yamazaki, Tokyo (JP);
Kenichiro Yoshino, Tokyo (JP);
Shinichi Hayase, Tokyo (JP);
Mitsutoshi Ohoka, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 156 days.

(21) Appl. No.: 10/231,248

(22) Filed: Aug. 30, 2002

(65) Prior Publication Data

US 2003/0068257 A1 Apr. 10, 2003

(30) Foreign Application Priority Data

Aug. 30, 2001 (JP) ........................................ 2001-261066

(51) Int. Cl.$^7$ ............................................. G02B 26/08
(52) U.S. Cl. ........................ 359/196; 359/226; 250/234
(58) Field of Search ................................ 359/196–226; 250/234–236; 235/462.16, 462.38, 476, 477

(56) References Cited

U.S. PATENT DOCUMENTS 5,751,459 A * 5/1998 Ohtomo et al. ............. 359/197
5,808,771 A * 9/1998 Ohtomo et al. ............. 359/196

* cited by examiner

Primary Examiner—James Phan
(74) Attorney, Agent, or Firm—Oblon, Spivak, McClelland, Maier & Neustadt, P.C.

(57) ABSTRACT

Disclosed is a rotational laser apparatus capable of setting an obliquity without requiring a high accuracy light receiver or a complex optical system for separating different polarized fluxes.

The rotational laser apparatus comprises a plurality of reflected sections provided on a target in a direction transverse to scanning laser beam.

The reflected planes is disposed in such a manner that a time series arranging state for pulses of the light receiving signal differs between a case that the scanning laser beam intersects the reflected sections from one side to the other side and a case that the laser beam intersects the reflected sections from the other side to one side, with identical scanning direction of the scanning laser beam, The control part includes a judging circuit for judging an operated direction of the oblique mechanism based on the time series arranging state for pulses of the light receiving signal.

3 Claims, 10 Drawing Sheets

APPARATUS FOR ROTATING A LASER

BACKGROUND OF THE INVENTION

1. Field of the Invention

The present invention relates to a rotational laser apparatus capable of forming a measuring reference plane, especially, a horizontal reference plane or any oblique setting plane inclined at a predetermined angle to the horizontal reference plane by means of laser beam.

2. Description of the Prior Art

Conventionally, there is known a rotational laser apparatus for forming a reference line on a laser plane measured with a laser-scanning plane by radiating laser beam from a laser beam source on a wall and so on while rotating the laser beam source. This is referred to as a laser survey machine. The laser plane is horizontally or obliquely formed and then high and low positions of or vertical positions of a point to be measured are determined based on the laser plane as reference.

When hoping to set the laser beam in a predetermined position, for example, an oblique position, data of changing an angler of gradient are input directly from input means into a main body or is set by moving a target which is provided in an radiating position.

Comparing with the direct input by the input means, setting by the target is easy and is relatively mostly used.

Figure 1:
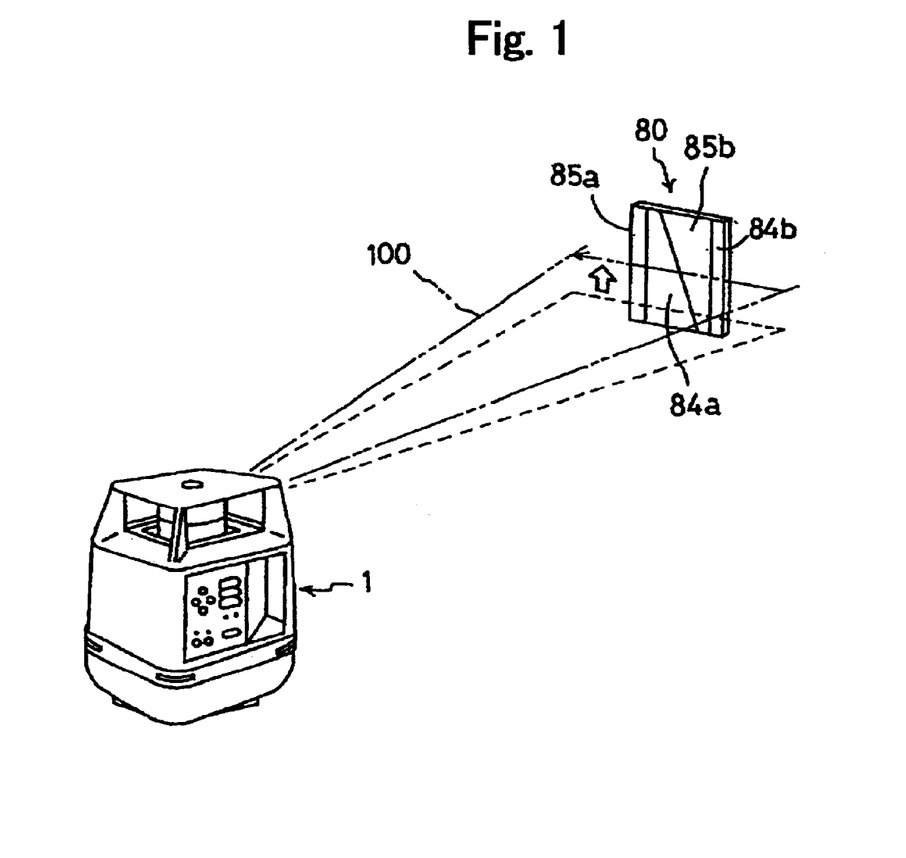
FIG. 1 is an operative explanatory of a conventional rotational laser apparatus.

FIG. 1 shows a state of changing an angle of gradient at a conventional target 80. Reflecting sections 85a and 85b are composed of mere reflection layers and reflecting sections 84a and 84b are composed of polarized light planes ($\lambda/4$ birefringment members) in addition to the reflection layers. Laser beam is scanned on the reflecting sections to detect a measured position on the reflecting sections and is moved along the reflecting sections by a predetermined distance until the measured position is detected and then is stopped when the measured position is detected.

The laser beam moves to trace a laser plane and changes an angle of gradient thereof when the target is moved.

Figure 2:
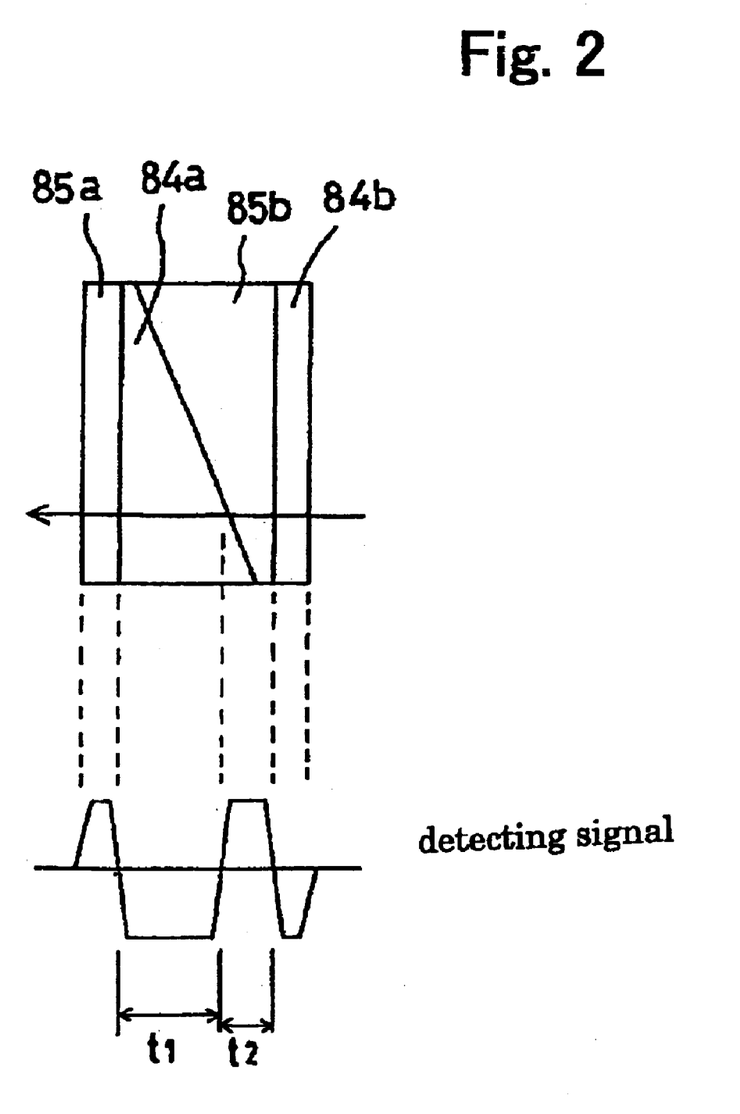
FIG. 2 is a view showing a target shown in FIG. 1 and a light receiving signal obtained by scanning the target.

FIG. 2 shows a signal obtained when the laser beam is scanned on the target.

Basically, the measured point is determined by detection of the reflecting sections 84a and 85b. The reflecting sections 84b and 85a determine clearly rising portions of the signal. The laser beam of circularly polarized light is used to distinguish laser light reflected on a reflected plane. For example, if the target is scanned to obtain time t1 from rise to decay and time t2 from decay to rise and the t1 is not equal to the t2, the laser beam is moved to become t1=t2.

Figure 3:
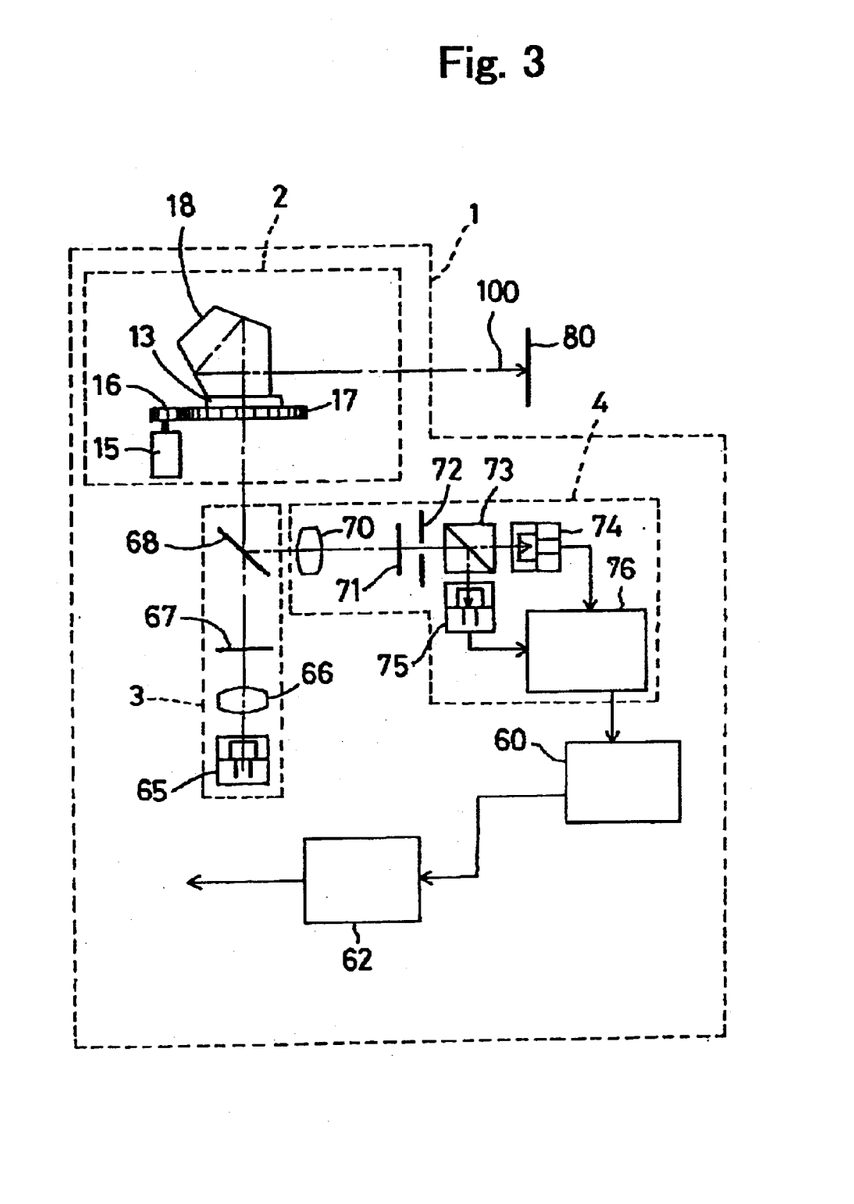
FIG. 3 is a view showing an optical an electrical construction of a conventional rotational radiating apparatus.

FIG. 3 shows an optical and electrical construction of the rotational laser apparatus. A rotational radiating apparatus 1 comprises a light emitting part 3, a rotated part 2, a reflected-light detecting part 4 and a control part (CPU) 60.

First, the light emitting part 3 will be explained.

A collimator lens 66, a first $\lambda/4$ birefringment member 67 and an holed mirror 68 are arranged in turn from a laser diode 65 side on an optical axis of the laser diode 65 which exits polarized radiating flux of linearly polarized light. The polarized radiating flux of linearly polarized light exited from the laser diode 65 is adapted to parallel by the collimator lens 66 and is changed into circularly polarized light by the first $\lambda/4$ multiple refracting member 67. The polarized radiating flux of circularly polarized light is exited through the holed mirror 68 into the rotated part 2.

The rotated part 2 changes an optical axis of polarized light radiating flux 100 from the light emitting part 3 by 90 degrees and scans the changed flux. A penta-prism 18 of changing the optical axis of the polarized light radiating flux from the light emitting part 3 is provided in a mirror holder 13 to rotate about the optical axis of the polarized light radiating flux. The mirror holder 13 is connected through a scanning gear 17 and a drive gear 16 with a scanning motor 15.

The radiated laser beam from the rotated part 2 is reflected on the target 80 and then polarized light reflected flux from the target 80 is inputted into the rotated part 2. The polarized light reflected flux inputted in the penta-prism 18 is deflected toward the holed mirror 68 which causes the polarized light reflected flux to be incident into the reflected-light detecting part 4.

Next, the reflected-light detecting part 4 will be explained.

A condenser lens 70, a second $\lambda/4$ birefringment member 71, a pinhole 72, a polarized light beam splitter 73 and a first photo-electric transformer 74 are arranged in turn from the holed mirror 68 side on a reflected optical axis of the holed mirror 68. A second photo-electric transformer 75 is disposed on a reflected optical axis of the polarized light beam splitter 73. An output from the first and second photo-electric transformers 74 and 75 is inputted in a reflected-light detecting circuit 76.

The beam splitter 73 divides the polarized light reflected flux inputted in the reflected-light detecting part 4 and causes them to input into the first and second photo-electric transformers 74 and 75. In this case, the second $\lambda/4$ birefringment member 71 and beam splitter 73 are arranged so that the polarized light radiating flux exited from the light emitting part 3 passes through the $\lambda/4$ birefringment member of the reflected plane of the target twice and flux of coinciding with deflected direction of the polarized light reflected flux which has been returned to the main body is inputted into the first photo-electric transformer 74 and the polarized light reflected flux which has been returned to the main body with the same deflected direction as a direction of the polarized light radiating flux exited from the light emitting part 3 is inputted into the second photo-electric transformer 75.

Further, the control part 60 (CPU) will be explained.

A signal from the reflected-light detecting part 4 is inputted into the control part 60. The control part 60 detects as a scanning signal the polarized light radiating flux scans which position of the target 80 from a relationship between the polarized light changing reflected part and a width of a reflected layer in the target 80. A signal from the control part 60 based on the detected position controls an oblique control portion 62 so that the oblique mechanism is driven to oblique the rotated part 2.

However, to detect the position on the target, further an oblique position for getting primarily and to position it, a high detecting ability and a calculating circuit of setting automatically the detection and position are required.

A high accurate light receiving detector and a complex optical system in which resolving ability is high to separate different polarized light fluxes are required for the high detecting ability. A high accurate workability together with a complex structure is, also, required for the complex optical system. The complex and high accurate structure is expensive and easily to damage.

High cost parts must be used to the control part for feeding back immediately detected results to a mechanical part.

Therefore, the rotational laser apparatus capable of performing an oblique setting automatically is expensive necessarily.

SUMMARY OF THE INVENTION

The present invention is made in view of the above and an object thereof is to provide a rotational laser apparatus capable of performing an oblique setting without requiring a complex optical system, such as a high accurate light receiver, to separate different polarized fluxes.

The rotational laser apparatus according to the present invention comprises a light emitting part for emitting scanning laser beam toward a target having reflected planes, a rotated part for forming a reference plane with the scanning laser beam from the light emitting part, an oblique mechanism for causing the rotated part to oblique, a light receiving part for receiving light reflected on the target and a control part for controlling the oblique mechanism according to a light receiving signal of the light receiving part.

The target is provided with a plurality of reflected sections transverse to the scanning laser beam.

The reflected sections are disposed in such a manner that a time series arranging state for pulse of the light receiving signal differs between a case that the scanning laser beam intersects the reflected sections from one side to the other side and a case that the laser beam intersects the reflected sections from the other side to the one side, with the same scanning direction of the scanning laser beam.

The control part includes a judging circuit for judging an operated direction of the oblique mechanism based on the time series arranging state for pulse of the light receiving signal.

In one embodiment, the rotational laser apparatus is adapted to form light receiving signal that reflected sections of the target differ in wide along the scanning direction, in the light receiving part.

In the other embodiment, the rotational laser apparatus is adapted to form light receiving signal that reflected sections of the target differ in space along the scanning direction, in the light receiving part.

DETAILED DESCRIPTION OF PREFERRED EMBODIMENTS

Figure 4:
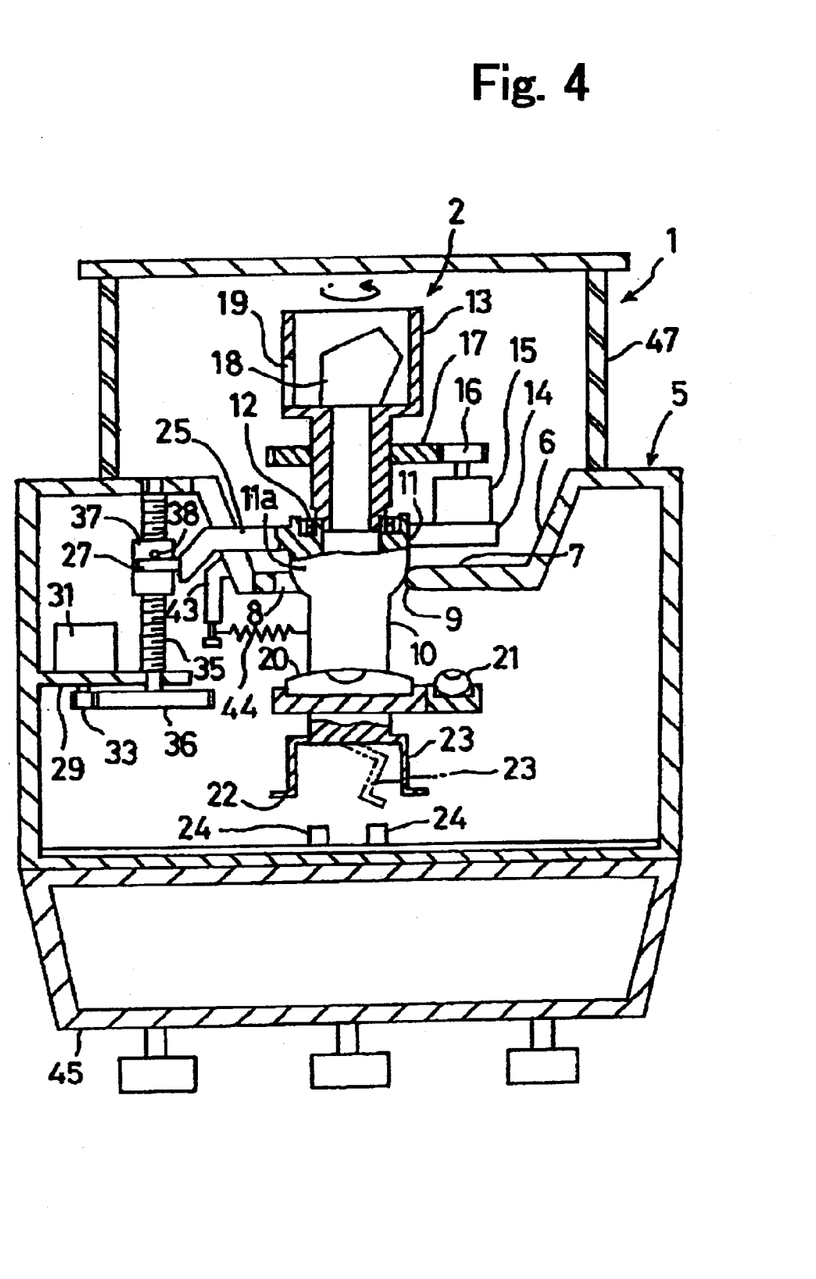
FIG. 4 is a view showing a mechanical construction of a rotational laser apparatus according to one embodiment of the present invention.
Figure 5:
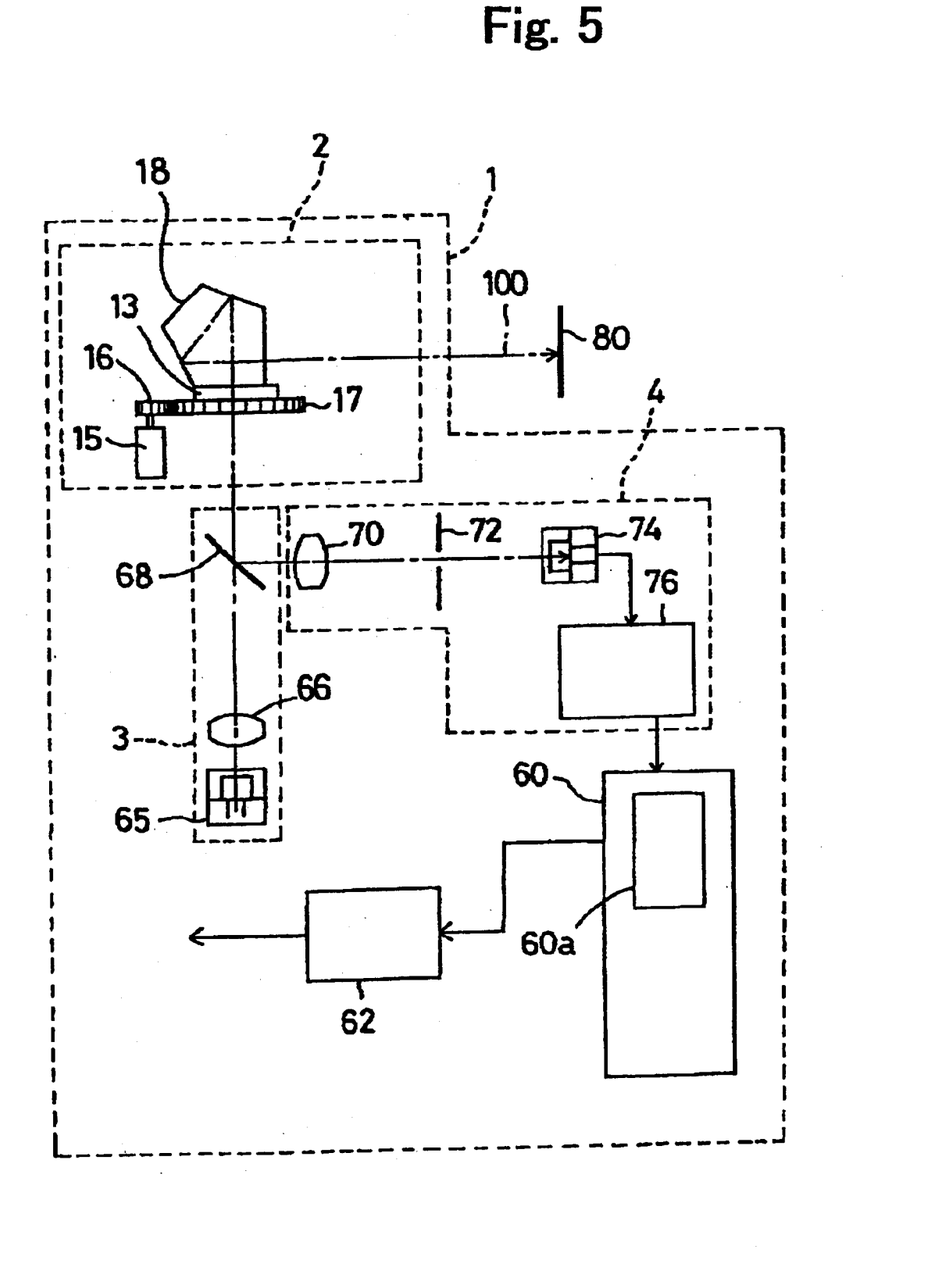
FIG. 5 is a view showing an optical and electrical construction of the laser apparatus according to one embodiment.

Referring to FIGS. 4 and 5, one embodiment of a rotational laser apparatus according to the present invention is shown. The rotational laser apparatus comprises a body 1, a rotated part, a light emitting part 3 and a reflected-light detecting part 4.

A center portion of a casing 5 is formed with a truncated conical recess 6, a center of which is formed with a supporter 7. The supporter 7 supports a laser floodlight 10. In other words, the supporter 7 supports the laser floodlight 10 by a projection 9 projected from an inner periphery of a through-hole 8.

A head portion 11 of the laser floodlight is provided with a motor mount 14 which is provided with a scanning motor 15. Attached to an output shaft of the scanning motor 15 is a drive gear 16 which is engaged with a scanning gear 17 which will be described hereinafter. The head portion 11 of the laser floodlight 10 is rotatably provided with a mirror holder 13 through a bearing 12 aligned with an axis of the laser floodlight 10.

The scanning gear 17 is fixed to the mirror holder 13. The scanning gear 17 is engaged with the drive gear 16 as described above and thus the mirror holder 13 is rotated about a perpendicular axis by the scanning motor 15. The mirror holder 13 is also provided with a penta-prism 18 which is adapted to exit horizontally laser beam emitted from the laser floodlight 10 through a transparent window 19.

The scanning motor 15, drive gear 16, mirror holder 13 and penta-prism 18 and so on constitute the rotated part as will be described hereinafter.

A lower portion of the laser floodlight 10 is provided with first and second level sensors 20 and 21 for detecting a level degree.

An oblique detector 23 for forming a reflecting mirror flange 22 is fixed to a lower end of the laser floodlight 10. Disposed on a bottom of the casing 5 opposite to the oblique detector 23 are four light sensors 24 composed of light emitting elements and light receiving elements arranged peripherally to detect a limit of obliquity.

A first oblique-moving arm 25 extending horizontally from the head portion 11 of the laser floodlight 10 is provided and a second oblique-moving arm (not shown) extending vertically to the first oblique-moving arm is disposed with the similar structure. An oblique mechanism is provided at a leading end of each of the first and second oblique-moving arms.

The leading end of the first oblique-moving arm 25 is provided with an engaging pin 27. Axes of this engaging pin 27 and engaging pin of the second oblique-moving arm are mutually vertical and are positioned in a plane passing a center of a spherical surface 11a.

The their engaging pins are movable upwardly and downwardly to incline the laser floodlight 10 in two mutually perpendicular directions.

The oblique mechanism of the first oblique-moving arm 25 is provided on an inner wall of the casing 5. Similarly, the oblique mechanism (not shown) of the second oblique-moving arm is provided vertically to the oblique mechanism of the first oblique-moving arm.

A shelf plate 29 is provided on the inner wall of the casing 5. A first level adjusting motor 31 is provided on the shelf plate 29. A first drive gear 33 is fitted on a drive shaft of the first level adjusting motor 31. A first screw shaft 35 perpendicular to the engaging pin 27 and disposed between a ceiling of the casing 5 and the shelf plate 29 is rotatably installed. A first driven gear 36 is fitted on the first screw shaft 35. The first driven gear 36 is engaged with the first drive gear 33. A first slide nut 37 is threaded into the first screw shaft 35 and a pin 38 is provided on the first slide nut 37. The pin 38 and engaging pin 27 are slidably contactable.

A spring 44 is provided between a spring fitting 43 and the laser floodlight 10. The pin 38 and engaging pin 27 are slidably contacted by biasing the laser floodlight 10 about the supporter 7 in an o'clock direction (in FIG. 1).

FIG. 5 shows an optical and electrical structure of the rotational laser apparatus in this embodiment.

The rotational laser apparatus comprises a control part (CPU) 60.

First, a description will be made with respect to the light emitting part 3. A collimator lens 66 and a holed mirror 68 are disposed in turn from a laser diode 65 side on an optical axis of the laser diode 65 which emits radiated flux. The radiated flux emitted from the laser diode 65 is formed in parallel flux by the collimator lens 66. The radiated flux is exited from the laser diode 65 through the holed mirror 68 into the rotated part 2.

The rotated part 2 deflects an optical axis of the radiated flux 100 inputted from the light emitting part 3 by 90 degrees and exits the same and then scans it. The penta-prism 18 which deflects the optical axis of the radiated flux from the light emitting part 3 by 90 degrees is provided on the mirror holder 13 which rotates about the optical axis of the radiated flux. The mirror holder 13 is connected through the scanning gear 17 and drive gear 16 with the scanning motor 15.

Radiated laser beam from the rotated part 2 is reflected on a target 80 and then the reflected flux from the target 80 is inputted into the rotated part 2. The reflected flux inputted in the penta-prism 18 is deflected toward the holed mirror 68, which causes the reflected flux to input into the reflected light detecting part 4.

Next, the reflected light detecting part 4 will be explained.

A condenser lens 70, a pin holed plate 72 and a photo-electrical transformer 74 are arranged in turn from the holed mirror 68 side on the reflected optical axis of the holed mirror 68. An output from the photo-electrical transformer 74 is inputted in a reflected detecting circuit 76.

Next, the control part 60 will be explained.

A signal from the reflected light detecting part 4 is inputted in the control part 60. The control part 60 has a judging circuit 60a for judging a direction of operation of the oblique mechanism based on the signal from reflected-light detecting part 4. The judging circuit 60a judges a direction of scanning from a relationship of width of the reflected plane of the target 80.

A signal from the control part 60 is inputted in an oblique-driving part 62 which drives the oblique mechanism to start an obliquity of the rotated part 2 in a predetermined direction.

Next, a target 90 will be explained.

As shown in FIGS. 6 and 7, the target 90 has two reflected planes 95a and 95b. in the illustrated embodiment, the reflected planes 95a and 95b are arranged in a direction of width of the target 90. These reflected sections are composed of conventional reflected sections.

Here, the reflected sections 95a and 95b are arranged to have different width in the direction of width of the target 90.

Figure 7A:
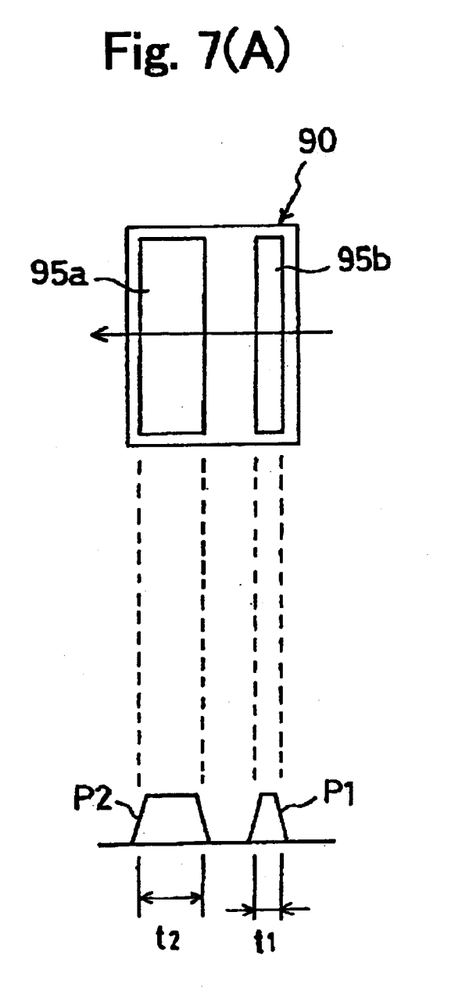
FIG. 7 is a view showing a target shown in FIG. 6 and a light receiving signal obtained by scanning the target.

The light-electrical transformer 74 scans the target 90 having the reflected sections 95a and 95b in a direction as shown by the arrow a and therefore outputs a light receiving signal including pulses p1 and p2 corresponding to the reflected sections 95a and 95b as shown in FIG. 7(A), with a predetermined time series arrangement which is decided by a scanning direction.

Figure 7B:
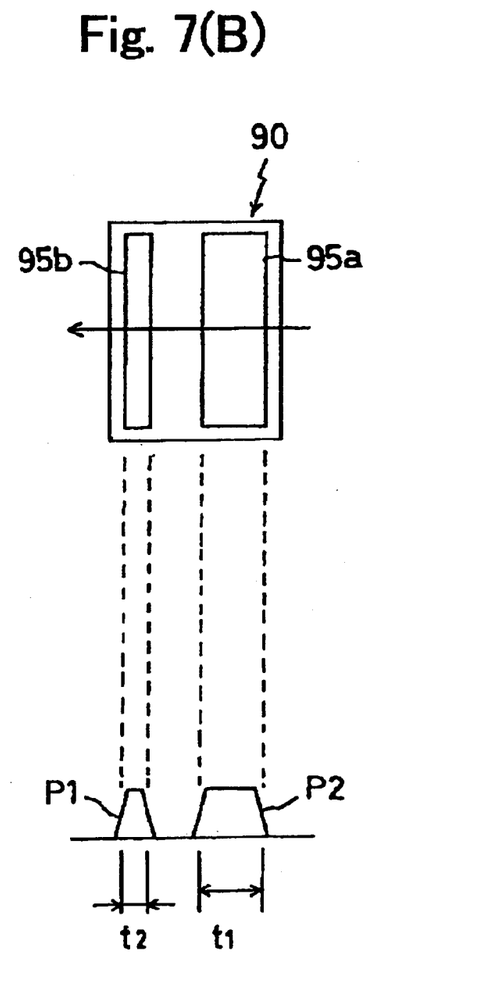

The time series arranging state of the pulses p1 and p2 of the light receiving signal which the light-electrical transformer receives as shown in FIG. 7(B) differs by using reversely the target 90 in the same scanning direction.

Consequently, the reflected sections 95a and 95b are formed so that a space of the pulses of the light receiving signal differs in time series between a case of arranging the target in such a manner that the scanning laser flux intersects the reflected sections 95a and 95b from one side to the other side and a case of arranging the target in such a manner that the scanning laser flux intersects the reflected sections from the other side to the one side, with an identical scanning direction of scanning laser flux 100.

Figure 6A:
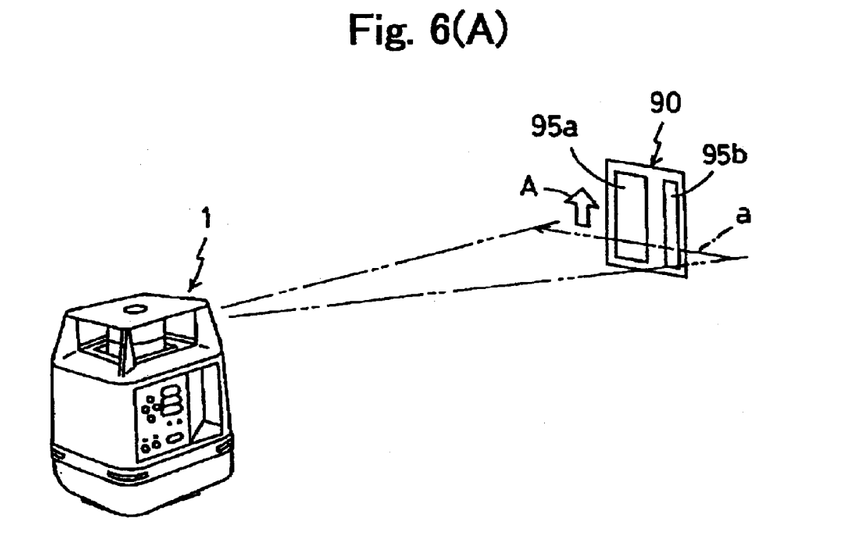
FIG. 6 is an operative explanatory view of the rotational laser apparatus according to one embodiment of the present invention.

As shown in FIG. 6(A), in a scanning direction as shown by the arrow a, the reflected sections are adapted to arrange from the narrow reflected section 95b to the wide reflected section 95a. In this case, the laser beam is directed to incline upwardly, for example.

Figure 6B:
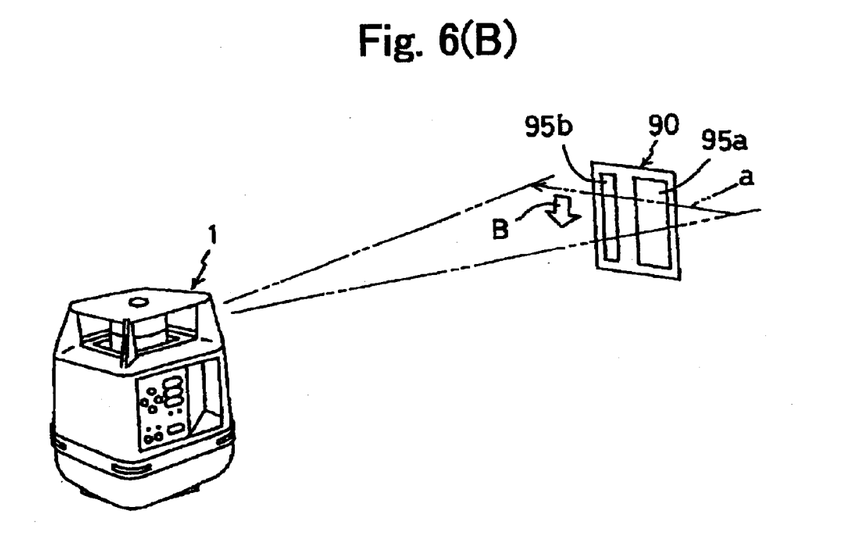

As shown in FIG. 6(B), in a scanning direction as shown by the arrow a, the reflected sections are adapted to arrange from the wide reflected section 95a to the narrow reflected section 95b and the laser beam is directed to incline downwardly.

Namely, in a case of showing in FIG. 7, the control part 60 judges being t1<t2, and then gives oblique instructions in the direction of the arrow a to the oblique-driving part 62. The oblique-driving part 62 starts to incline the oblique mechanism in the predetermined direction according to the instructions. As shown in FIG. 7(B), the control part 60 judges being t1>t2 and then operates the oblique mechanism in the opposite direction (direction of the arrow B) to be t1<t2.

Note that when the target is removed, an operation of obliquity is stopped at its oblique angle to become a predetermined oblique position. Although the above has been described for setting one oblique direction, it is possible to set two directions in case of an oblique mechanism for two directions.

Figure 8:
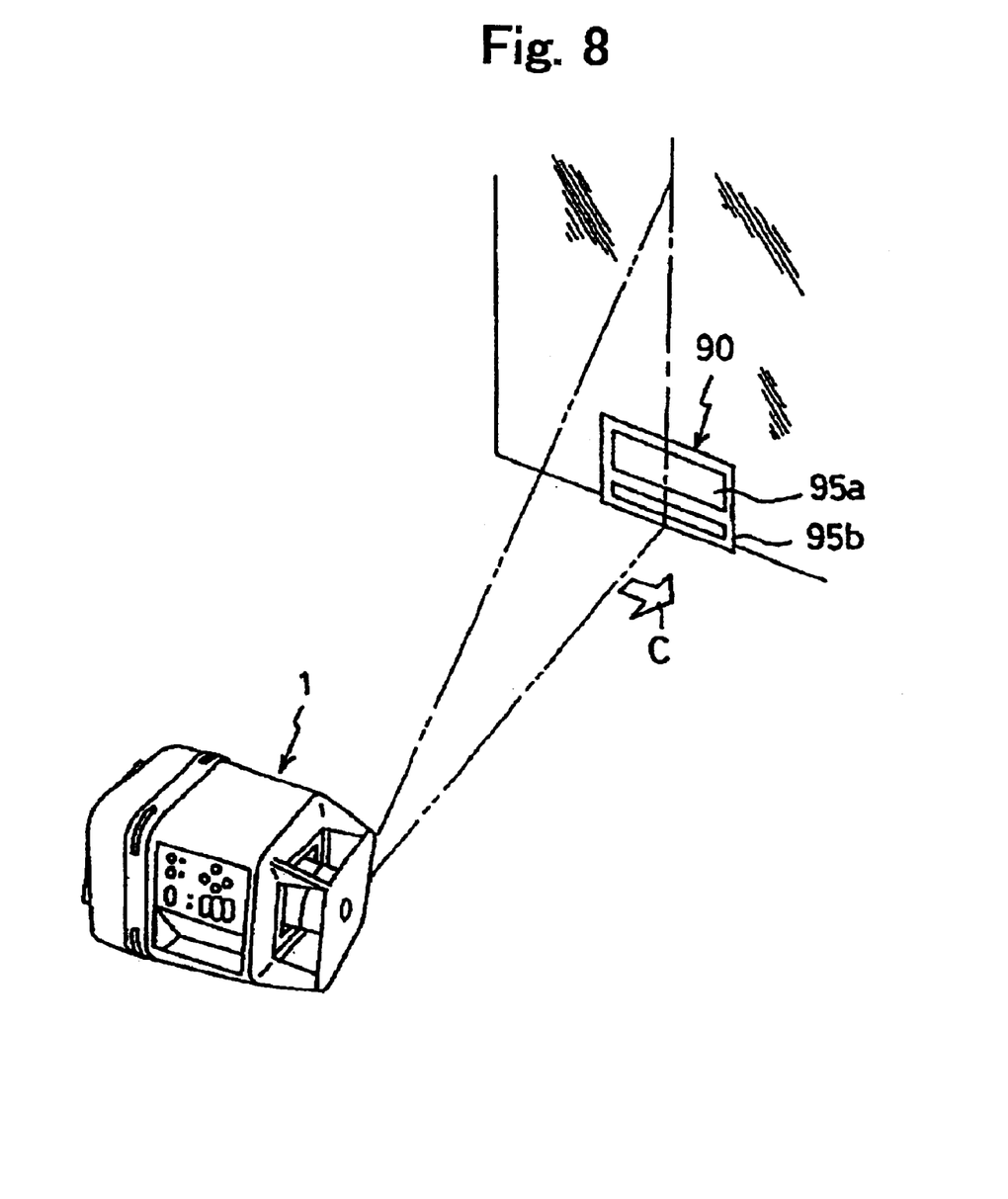
FIG. 8 is an operative explanatory view in case of changing setting of the rotational laser apparatus according to one embodiment of the present invention.

FIG. 8 shows an example in which the rotational laser apparatus is lied sideways in order to form vertical laser beam. In this case, a vertical surface moves right and left. In the drawing, it is a right direction of the arrow C, basically, setting is the same as that in a case of horizon.

The present invention can also adopt a target 110 as shown in FIGS. 9 and 10. In the drawings, the target 110 has reflected planes 115a, 115b and 115c of the same width and a space between the adjacent reflected planes is different.

The light-electrical transformer 74 scans the target 110 having the reflected sections 115a, 115b and 115c in a direction of showing in the arrow a and therefore outputs a light receiving signal including pulses p1, p2 and p3 corresponding to their reflected planes 115a to 115c as shown in FIG. 7(A), with a predetermined time series arrangement which is decided by a scanning direction.

Figure 10A:
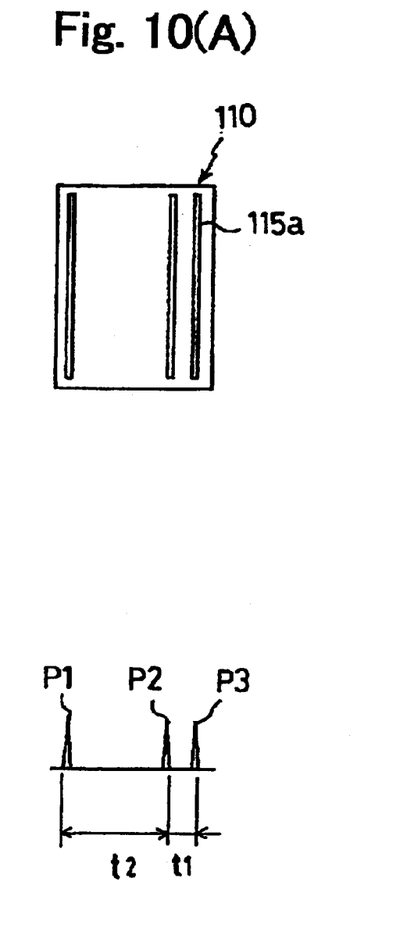
FIG. 10 is a view showing a target shown in FIG. 9 and a light receiving signal obtained by scanning the target.
Figure 10B:
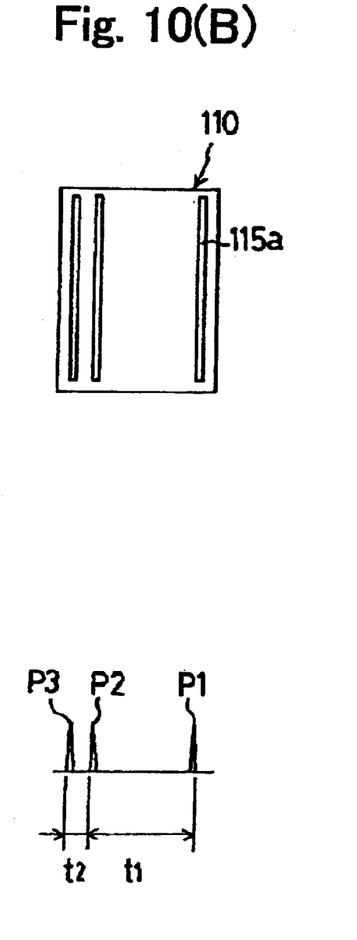

The time series arrangement of the pulses p1, p2 and p3 of the light receiving signal received by the photo electrical transformer as shown in FIG. 10(B) is different by using reversely the target 110 with the same scanning direction.

Consequently, the reflected sections 115*a* to 115*c* are formed so that a space of the pulses of the light receiving signal differs in time series between a case of arranging the target 110 in such a manner that the scanning laser flux intersects the reflected planes 115*a* to 115*c* from one side to the other side and a case of arranging the target 110 in such a manner that the scanning laser flux intersects the reflected planes from the other side to the one side, with an identical scanning direction of scanning laser flux 100.

Figure 9A:
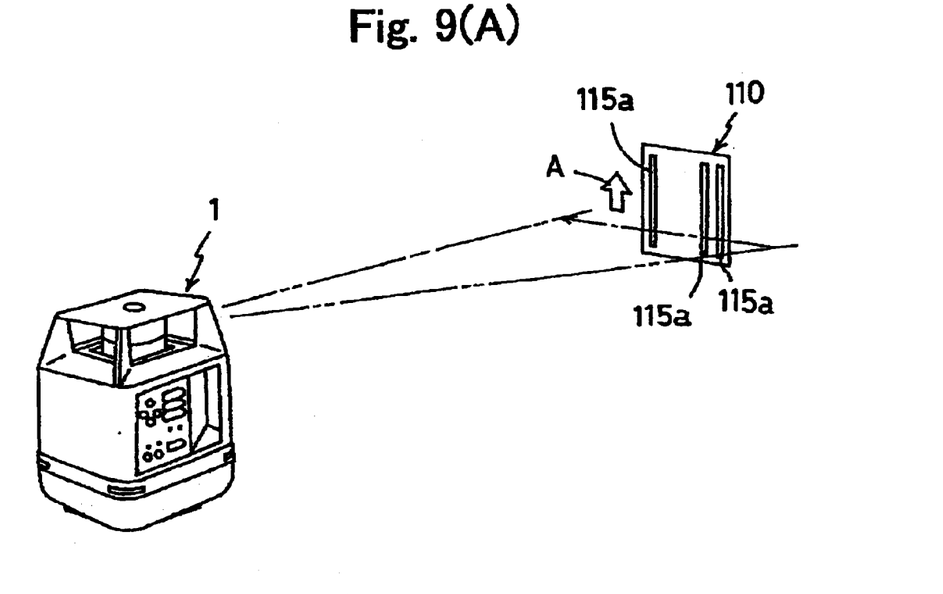
FIG. 9 is an operative explanatory view of a rotational laser apparatus according to the other embodiment of the present invention.

Here, for example, when the target is disposed as shown in FIG. 9(A), the light receiving signal is adapted to become t1<t2 as shown in FIG. 10(A) and therefore the control part 60 performs judgment of inclining upwardly the oblique mechanism, thereby sending oblique instructions in a direction of the arrow A to the oblique mechanism.

Figure 9B:
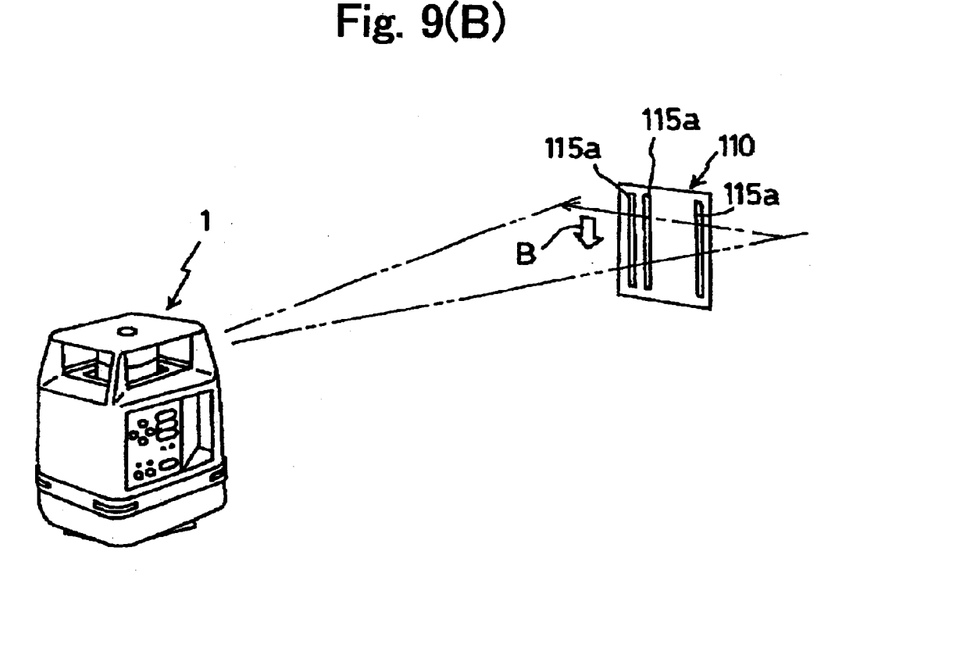

The oblique mechanism is operated in accordance with the instructions of the control part. Alternatively, if the target is disposed as shown in FIG. 9(B), the light receiving signal is as shown in FIG. 10(B) to become t1>t2, and then the control part 60 performs judgment of inclining downwardly the oblique mechanism, thereby sending oblique instructions in a direction of the arrow B to the oblique mechanism. The oblique mechanism is operated in accordance with the instructions of the control part.

According to the present invention, it is possible to provide a rotational laser apparatus capable of setting an obliquity without requiring a high accuracy light receiver or a complex optical system which separates different polarized fluxes.

What is claimed is:

1. A rotational laser apparatus comprising:

a light emitting part for emitting scanning laser beam toward a target having reflected sections;

a rotated part for forming a reference plane with the scanning laser beam from the light emitting part;

an oblique mechanism for causing the rotated part to oblique;

a light receiving part for receiving light reflected on the target; and a control part for controlling the oblique mechanism according to a light-receiving signal of the light receiving part, said target being provided with a plurality of reflected sections transverse to the scanning laser beam, said reflected sections being disposed in such a manner that a time series arranging state for pulses of the light receiving signal differs between a case that the scanning laser beam intersects the reflected planes from one side to the other side and a cases that the laser beam intersects the reflected sections from the other side to the one side, with an identical scanning direction of the scanning laser beam, said control part including a judging circuit for judging an operated direction of the oblique mechanism based on the time series arranging state for pulses of the light receiving signal.

2. A rotational laser apparatus according to claim 1, wherein said rotational laser apparatus is adapted to form a light receiving signal that reflected sections of the target differ in wide along the scanning direction, in the light receiving part.

3. A rotational laser apparatus according to claim 1, wherein said rotational laser apparatus is adapted to form a light receiving signal that reflected planes of the target differ in space along the scanning direction, in the light receiving part.

* * * * *